US012005743B2

(12) United States Patent
Kawakita

(10) Patent No.: US 12,005,743 B2
(45) Date of Patent: Jun. 11, 2024

(54) TIRE

(71) Applicant: BRIDGESTONE CORPORATION, Tokyo (JP)

(72) Inventor: Akihiro Kawakita, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 523 days.

(21) Appl. No.: 17/254,897

(22) PCT Filed: Jun. 27, 2019

(86) PCT No.: PCT/JP2019/025625
§ 371 (c)(1),
(2) Date: Dec. 22, 2020

(87) PCT Pub. No.: WO2020/008997
PCT Pub. Date: Jan. 9, 2020

(65) Prior Publication Data
US 2021/0260927 A1    Aug. 26, 2021

(30) Foreign Application Priority Data

Jul. 4, 2018   (JP) .................................. 2018-127650

(51) Int. Cl.
*B60C 11/03*   (2006.01)
*B60C 11/12*   (2006.01)
*B60C 11/13*   (2006.01)

(52) U.S. Cl.
CPC ....... *B60C 11/0302* (2013.01); *B60C 11/0311* (2013.01); *B60C 11/1236* (2013.01);
(Continued)

(58) Field of Classification Search
CPC ............. B60C 11/0302; B60C 11/0311; B60C 11/1384; B60C 2011/0313; B60C 2011/0346; B60C 2011/0358
See application file for complete search history.

(56) References Cited

U.S. PATENT DOCUMENTS 5,725,700  A      3/1998  Ichiki
D778,230   S  *   2/2017  Haanketo .............. D12/564
(Continued)

FOREIGN PATENT DOCUMENTS

DE    19705156 A1    10/1997
EP    0 259 243 A2    3/1988
(Continued)

OTHER PUBLICATIONS

Feb. 21, 2022 Search Report issued in European Patent Application No. 19830207.7.
(Continued)

*Primary Examiner* — Justin R Fischer
*Assistant Examiner* — Philip N Schwartz
(74) *Attorney, Agent, or Firm* — Oliff PLC

(57) ABSTRACT

A tire includes a tread surface portion with inclined grooves, 2ND longitudinal grooves, and shoulder longitudinal grooves; and an indicator portion that indicates a rotation direction of the tire in which a vehicle travels forward. The inclined groove gradually extends forward in the rotation direction toward a tire equator from the outside in the tire width direction. A front surface among inner surfaces defining the inclined groove includes a first side surface with an inner end portion to which the 2ND longitudinal groove is open, a second side surface positioned closer to an inside than the first side surface and of which an outer end portion is positioned closer to a rear side than the inner end portion of the first side surface, and a stepped surface that connects an inner edge of the first side surface to an outer edge of the second side surface and faces the outside.

19 Claims, 2 Drawing Sheets

(52) U.S. Cl.
CPC ... *B60C 11/1384* (2013.01); *B60C 2011/0313* (2013.01); *B60C 2011/0346* (2013.01); *B60C 2011/0348* (2013.01); *B60C 2011/0358* (2013.01); *B60C 2011/1213* (2013.01)

(56) References Cited

U.S. PATENT DOCUMENTS

| | | | | |
|---|---|---|---|---|
| D806,000 | S | * 12/2017 | Diensthuber | ............... D12/564 |
| 2004/0069389 | A1 | 4/2004 | Ratliff | |
| 2007/0131324 | A1 | 6/2007 | Fujita | |
| 2015/0298506 | A1* | 10/2015 | Katayama | ............... B60C 5/00 152/209.25 |
| 2015/0352902 | A1 | 12/2015 | Takei et al. | |
| 2016/0221397 | A1 | 8/2016 | Maehara et al. | |
| 2017/0036489 | A1 | 2/2017 | Fujita | |
| 2017/0239997 | A1 | 8/2017 | Nishino | |
| 2017/0368889 | A1 | 12/2017 | Ajoviita et al. | |

FOREIGN PATENT DOCUMENTS

| | | | |
|---|---|---|---|
| EP | 3 326 841 | A1 | 5/2018 |
| EP | 3 501 849 | A1 | 6/2019 |
| JP | S63-064802 | A | 3/1988 |
| JP | H09-132011 | A | 5/1997 |
| JP | 2007-161114 | A | 6/2007 |
| JP | 2013-116708 | A | 6/2013 |
| JP | 2014-080112 | A | 5/2014 |
| JP | 2014-151786 | A | 8/2014 |
| JP | 2015-116845 | A | 6/2015 |
| JP | 2016-002815 | A | 1/2016 |
| JP | 2016002815 | A * 1/2016 | ............. B60C 11/11 |
| JP | 2016-088407 | A | 5/2016 |
| JP | 2017-226368 | A | 12/2017 |
| JP | 2018-027762 | A | 2/2018 |
| WO | 2014/084325 | A1 | 6/2014 |
| WO | 2015/156010 | A1 | 10/2015 |
| WO | 2017/212399 | A1 | 12/2017 |

OTHER PUBLICATIONS

Sep. 10, 2019 International Search Report issued in International Patent Application No. PCT/JP2019/025625.

* cited by examiner

TIRE

TECHNICAL FIELD

The present invention relates to a tire.

Priority is claimed on Japanese Patent Application No. 2018-127650, filed on Jul. 4, 2018, the content of which is incorporated herein by reference.

BACKGROUND ART

A tire disclosed in, for example, Patent Document 1 to be described below of which a tread surface portion is provided with a plurality of inclined grooves and shoulder longitudinal grooves is known in the related art. The plurality of inclined grooves gradually extend toward one side in a tire circumferential direction toward the outside in the tire width direction from a tire equator and are arranged at intervals in the tire circumferential direction, and the shoulder longitudinal grooves connect the inclined grooves adjacent to each other in the tire circumferential direction.

CITATION LIST

Patent Document

[Patent Document 1]
Japanese Unexamined Patent Application, First Publication No. 2014-151786

SUMMARY OF INVENTION

Technical Problem

However, there is room for improvement in drainage performance in the tire of the related art.

The present invention has been made in consideration of the above-mentioned circumstances, and an object of the present invention is to provide a tire that can improve drainage performance.

Solution to Problem

A tire according to an aspect of the present invention includes a tread surface portion; the tread surface portion is provided with a plurality of inclined grooves that have a V shape to cross each other or to be close to each other near a tire equator in a plan view seen from an outside in a tire radial direction and are arranged in a tire circumferential direction, 2ND longitudinal grooves that connect the inclined grooves adjacent to each other in the tire circumferential direction, and shoulder longitudinal grooves that are positioned closer to an outside in a tire width direction than the 2ND longitudinal grooves and connect the inclined grooves adjacent to each other in the tire circumferential direction; the tire includes an indicator portion that indicates a rotation direction of the tire in which a vehicle travels forward; the inclined groove gradually extends forward in the rotation direction toward the tire equator from the outside in the tire width direction; and a front surface positioned on a front side in the rotation direction among inner surfaces defining the inclined groove includes a first side surface that includes an inner end portion in the tire width direction to which the 2ND longitudinal groove is open, a second side surface which is positioned closer to an inside in the tire width direction than the first side surface and of which an outer end portion in the tire width direction is positioned closer to a rear side in the rotation direction than the inner end portion of the first side surface in the tire width direction, and a stepped surface that connects an inner edge of the first side surface in the tire width direction to an outer edge of the second side surface in the tire width direction and faces the outside in the tire width direction.

Advantageous Effects of Invention

According to the present invention, drainage performance can be improved.

DESCRIPTION OF EMBODIMENTS

Figure 1:
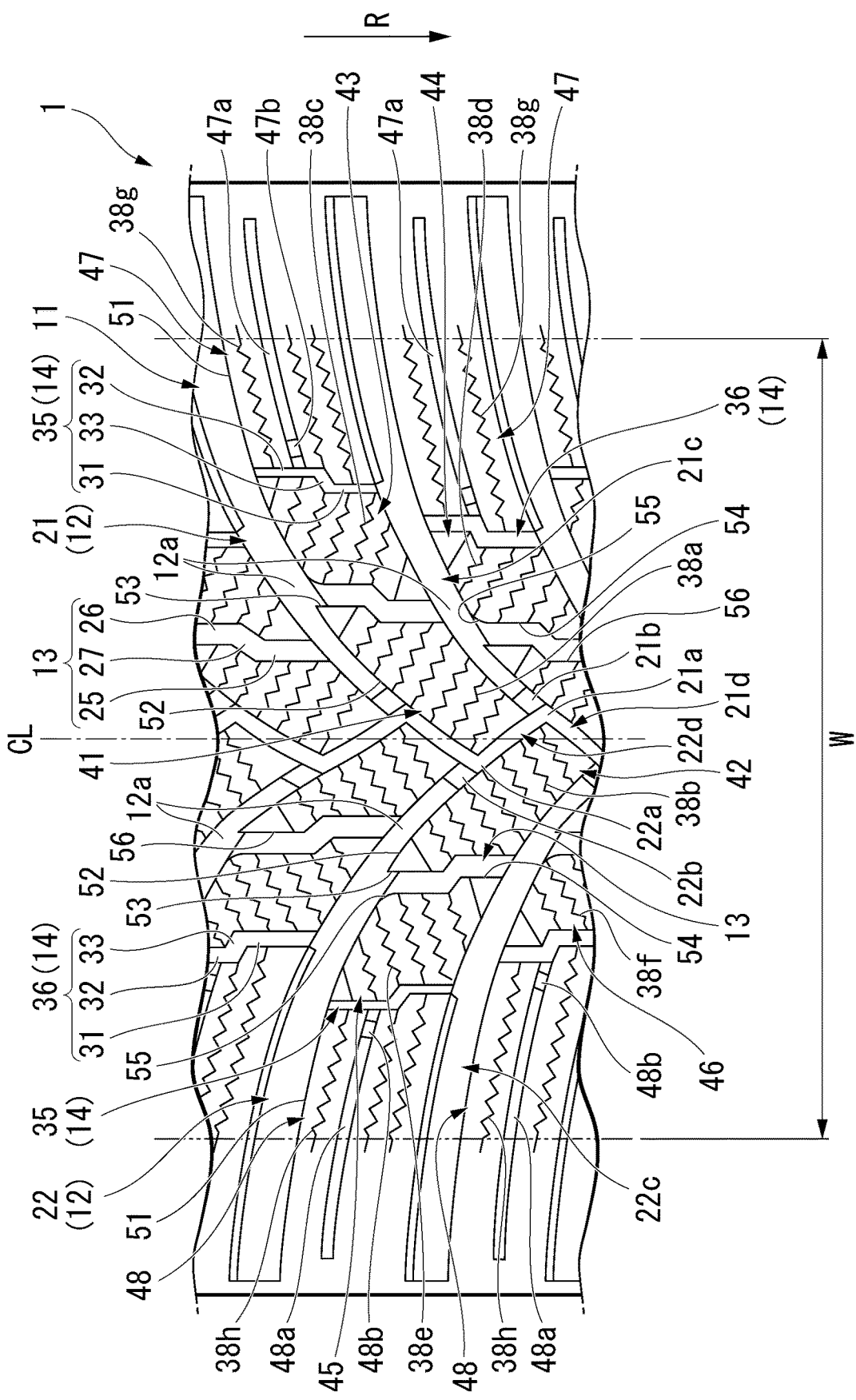
FIG. 1 is a plan view of a tread surface portion of a tire according to an embodiment of the present invention.
Figure 2:
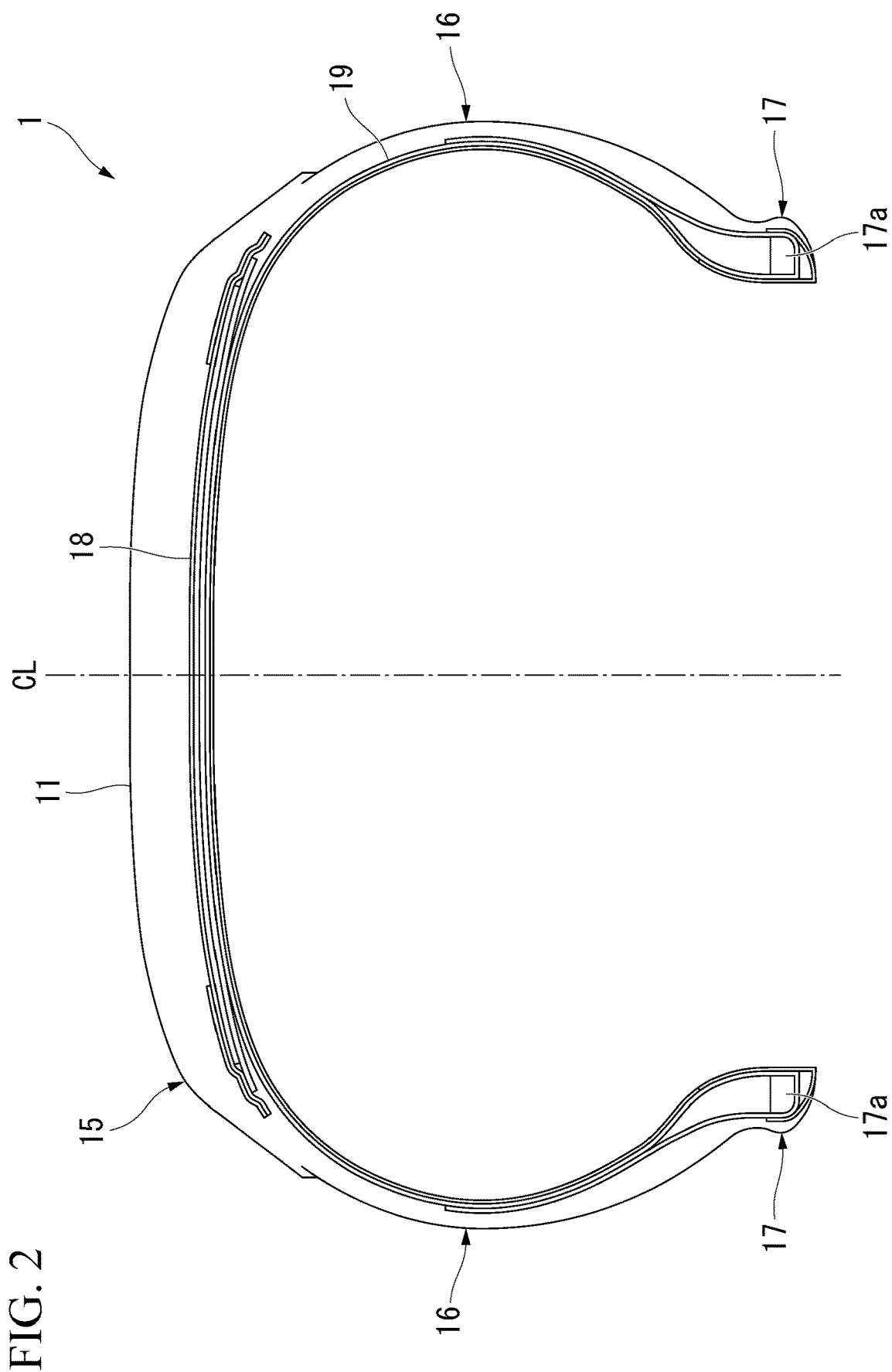
FIG. 2 is a cross-sectional view taken in a tire width direction of the tire shown in FIG. 1.

A tire 1 according to an embodiment of the present invention will be described below with reference to FIGS. 1 and 2.

The tire 1 may be employed, for example, as a winter tire (snow tire) that travels on an icy and snowy road surface or a tire for high-speed travel on the autobahn in Europe or the like.

The tire 1 includes a tread portion 15 that is positioned at an outer end portion in a tire radial direction, a pair of side wall portions 16 that extends inward in the tire radial direction from both end portions of the tread portion 15 in the tire width direction, and bead portions 17 that are connected to inner end portions of the side wall portions 16 in the tire radial direction. A bead core 17a is embedded in each bead portion 17. A belt 18 is embedded in the tread portion 15. The outer peripheral surface of the tread portion 15, which faces the outside in the tire radial direction, is a tread surface portion 11. A carcass ply 19 is integrally embedded in the tread portion 15, the side wall portions 16, and the bead portions 17. The carcass ply 19 is folded back around the bead cores 17a. For example, indicator portions (not shown), such as arrows, which can specify the rotation direction R of the tire 1 in a case where a vehicle on which the tire 1 is mounted travels forward, are formed on the outer surface of the tire 1. The indicator portions are formed on the outer surfaces of, for example, the side wall portions 16 of the tire 1.

The tire 1 includes the tread surface portion 11, and inclined grooves 12, 2ND longitudinal grooves 13, and shoulder longitudinal grooves 14 are formed on the tread surface portion 11.

Here, the tread surface portion 11 means the tread of the tread portion in a state where, for example, the tire 1 is mounted on a standard rim prescribed in "JATMA Year Book" and the tire 1 is filled with air up to an internal pressure (hereinafter, referred to as prescribed internal pressure) of 100% of air pressure (maximum air pressure) corresponding to the maximum load capacity (a bold load in an internal pressure-load capacity table) at an application size and a ply rating described in "JATMA Year Book" so that the maximum load capacity is applied to the tire 1.

In a case where a region in which the tire 1 is produced or used is other than Japan, the tread surface portion 11 means the tread of a tread portion based on industrial standards (for example, "TRA Year Book" of the United States of America, "ETRTO Standard Manual" of Europe, or the like) applied to the region.

The inclined grooves 12 have a V shape to cross each other or to be close to each other near a tire equator CL in a plan view seen from the outside in the tire radial direction. "Near a tire equator CL" means, for example, an area of the tread surface portion 11 that is positioned closer to the inside in the tire width direction than positions each of which is spaced from the tire equator CL in the tire width direction by about 10% of the entire length (hereinafter, referred to as a tread width) W of the tread surface portion 11 in the tire width direction.

The plurality of inclined grooves 12 are arranged in a tire circumferential direction. The inclined grooves 12 are arranged over the entire area of the tread surface portion 11 in the tire width direction. The inclined grooves 12 gradually extend forward in the rotation direction R toward the tire equator CL from the outside in the tire width direction.

Each of the inclined grooves 12 includes a first inclined groove 21 that gradually extends rearward in the rotation direction R toward one side (right side in FIG. 1) from the tire equator CL in the tire width direction, and a second inclined groove 22 that gradually extends rearward in the rotation direction R toward the other side (left side in FIG. 1) from the tire equator CL in the tire width direction. A plurality of first inclined grooves 21 and a plurality of second inclined grooves 22 are arranged on the tread surface portion 11 at regular intervals in the tire circumferential direction.

The first inclined groove 21 and the second inclined groove 22 are curved so as to protrude rearward in the rotation direction R in the plan view. The width of each of the first inclined groove 21 and the second inclined groove 22 is gradually reduced toward the tire equator CL from the outside in the tire width direction.

An inner end portion of the first inclined groove 21 close to the tire equator CL is positioned closer to the other side in the tire width direction than the tire equator CL, and an inner end portion of the second inclined groove 22 close to the tire equator CL is positioned closer to one side in the tire width direction than the tire equator CL. Accordingly, each inclined groove 12 and the tire equator CL cross each other in the plan view. The inner end portion of the first inclined groove 21 is positioned closer to the rear side in the rotation direction R than the inner end portion of the second inclined groove 22 and is connected to the second inclined groove 22. In the plan view, an angle between the first inclined groove 21 and the second inclined groove 22 may be 50° or more and 140° or less and may be 70° or more and 110° or less and is about 90° in the example shown in FIG. 1.

The depth of an outer portion 22c of the second inclined groove 22 positioned on the outside of a connection portion 22a, to which the inner end portion of the first inclined groove 21 is connected, in the tire width direction is deeper than each of the depth of an inner portion 22d positioned close to the tire equator CL and the depth of the connection portion 22a. The depth of an inner end portion 22b of the outer portion 22c of the second inclined groove 22 in the tire width direction is gradually reduced toward the inside from the outside in the tire width direction.

With regard to the inclined grooves 12 adjacent to each other in the tire circumferential direction, the inner end portion of the second inclined groove 22 of the inclined groove 12, which is positioned on the rear side in the rotation direction R, is connected to the first inclined groove 21 of the inclined groove 12 positioned on the front side in the rotation direction R.

The depth of an outer portion 21c of the first inclined groove 21 positioned on the outside of a connection portion 21a, to which the inner end portion of the second inclined groove 22 of the inclined groove 12 positioned closer to the rear side in the rotation direction R than the first inclined groove 21 is connected, in the tire width direction is larger than each of the depth of an inner portion 21d positioned close to the tire equator CL and the depth of the connection portion 21a. The depth of an inner end portion 21b of the outer portion 21c of the first inclined groove 21 in the tire width direction is gradually reduced toward the inside from the outside in the tire width direction. In the plan view, the inclination angles of the inner portions 21d and 22d of the first inclined groove 21 and the second inclined groove 22 with respect to the tire circumferential direction are smaller than the inclination angles of the outer portions 21c and 22c thereof with respect to the tire circumferential direction respectively and are in the range of, for example, about 30° to 45°.

The 2ND longitudinal grooves 13 connect the inclined grooves 12 adjacent to each other in the tire circumferential direction. The 2ND longitudinal grooves 13 are separately arranged on both sides of the tire equator CL in the tire width direction with the tire equator CL interposed therebetween. The 2ND longitudinal grooves 13 connect the outer portions 21c and 22c of the first inclined groove 21 and the second inclined groove 22 that are adjacent to each other in the tire circumferential direction. Each 2ND longitudinal groove 13 is disposed at a portion of the tread surface portion 11 positioned closer to the inside in the tire width direction than a position that is spaced from the tire equator CL by about ¼ of the tread width W in the tire width direction. The 2ND longitudinal grooves 13 adjacent to each other in the tire circumferential direction are arranged so as to have positions different from each other in the tire width direction. The respective opening portions, which are open to the same inclined groove 12, of the respective 2ND longitudinal grooves 13, which are adjacent to each other in the tire circumferential direction, are spaced from each other in the tire width direction. That is, the opening portions of the 2ND longitudinal grooves 13 on the inclined groove 12 face side surfaces, which face in the tire circumferential direction, among the inner surfaces defining the inclined groove 12 over the entire area thereof. The 2ND longitudinal grooves 13 adjacent to each other in the tire circumferential direction are arranged in a staggered manner.

For example, the width of the 2ND longitudinal groove 13 may be 3 mm or more and 13 mm or less and may be 4 mm or more and 7 mm or less and is constant over the entire length thereof. A shift distance in the tire width direction between the 2ND longitudinal grooves 13, which are adjacent to each other in the tire circumferential direction, is 1.0 or more times and 2.0 or less times the width of the 2ND longitudinal groove 13. That is, the 2ND longitudinal grooves 13 adjacent to each other in the tire circumferential direction are arranged at positions where the 2ND longitudinal grooves 13 do not overlap with each other in the tire width direction. The width of the 2ND longitudinal groove 13 is equal to or smaller than the width of at least the connection portion 12a of the inclined groove 12 connected to the 2ND longitudinal groove 13. The width of the 2ND longitudinal groove 13 is larger than the width of each of the inner portions 21d and 22d of the first inclined groove 21 and the second inclined groove 22.

The depth of the 2ND longitudinal groove 13 is constant over the entire length thereof. The depth of the 2ND longitudinal groove 13 is smaller than the depth of each of the outer portions 21c and 22c of the first inclined groove 21 and the second inclined groove 22. The depth of the 2ND longitudinal groove 13 may be 0.4 or more times to 1.0 or less times the depth of each of the outer portions 21c and 22c and may be 0.5 or more times and 0.9 or less times the depth thereof. The depth of the 2ND longitudinal groove 13 is equal to the depth of each of the inner portions 21d and 22d of the first inclined groove 21 and the second inclined groove 22.

Each 2ND longitudinal groove 13 includes a first longitudinal groove 25 that is connected to one inclined groove 12 of the inclined grooves 12 adjacent to each other in the tire circumferential direction, a second longitudinal groove 26 that is disposed at each position different from the position of the first longitudinal groove 25 in the tire width direction and the tire circumferential direction and is connected to the other inclined groove 12 of the inclined grooves 12 adjacent to each other in the tire circumferential direction, and a first step groove 27 that connects the first longitudinal groove 25 to the second longitudinal groove 26.

The respective lengths of the first longitudinal groove 25 and the second longitudinal groove 26 are equal to each other and are longer than the length of the first step groove 27. For example, the length of each of the first longitudinal groove 25 and the second longitudinal groove 26 is two or more times the length of the first step groove 27. The size of the first step groove 27 in the tire circumferential direction may be 0.03 or more and 0.3 or less times the size of the 2ND longitudinal groove 13 in the tire circumferential direction and may be 0.05 or more times and 0.2 or less times the size thereof. A shift distance in the tire width direction between the first longitudinal groove 25 and the second longitudinal groove 26 is shorter than the width of the 2ND longitudinal groove 13. A shift distance in the tire width direction between the first longitudinal groove 25 and the second longitudinal groove 26 may be 0.2 or more times and 0.8 or less times the width of the 2ND longitudinal groove 13 and may be 0.3 or more times and 0.7 or less times the width thereof. The inclination angle of the first step groove 27 with respect to the tire width direction may be 25° or more and 65° or less and may be 30° or more and 60° or less.

The first longitudinal groove 25 is positioned on the front side of the second longitudinal groove 26 in the rotation direction R and on the inside thereof in the tire width direction. The respective inclination angles of the first step groove 27 and the outer portions 21c and 22c with respect to the tire circumferential direction are equal to each other. Among the plurality of 2ND longitudinal grooves 13 arranged in the tire circumferential direction in a staggered manner, the respective positions of an inner edge, which is positioned on the inside in the tire width direction, of the first longitudinal groove 25 of the 2ND longitudinal groove 13 positioned on the outside in the tire width direction and an outer edge, which is positioned on the outside in the tire width direction, of the second longitudinal groove 26 of the 2ND longitudinal groove 13 positioned on the inside in the tire width direction are equal to each other in the tire width direction. The shoulder longitudinal grooves 14 are positioned closer to the outside in the tire width direction than the 2ND longitudinal grooves 13, and connect the inclined grooves 12 adjacent to each other in the tire circumferential direction. The shoulder longitudinal grooves 14 are separately arranged on both sides of the tire equator CL in the tire width direction with the tire equator CL interposed therebetween. The shoulder longitudinal grooves 14 connect the outer portions 21c and 22c of the respective first and second inclined grooves 21 and 22 that are adjacent to each other in the tire circumferential direction. A distance in the tire width direction between the shoulder longitudinal groove 14 and the 2ND longitudinal groove 13, which are adjacent to each other in the tire width direction, is longer than the shift distance in the tire width direction between the 2ND longitudinal grooves 13 that are adjacent to each other in the tire circumferential direction.

The shoulder longitudinal grooves 14 adjacent to each other in the tire circumferential direction are arranged so as to have positions different from each other in the tire width direction. The respective opening portions, which are open to the same inclined groove 12, of the respective shoulder longitudinal grooves 14, which are adjacent to each other in the tire circumferential direction, are spaced from each other in the tire width direction. That is, the opening portions of the shoulder longitudinal grooves 14 on the inclined groove 12 face side surfaces, which face in the tire circumferential direction, among the inner surfaces defining the inclined groove 12 over the entire area thereof. The shoulder longitudinal grooves 14 are arranged in the tire circumferential direction in a staggered manner. The width of the shoulder longitudinal groove 14 is constant over the entire length thereof. The width of the shoulder longitudinal groove 14 is smaller than the width of the 2ND longitudinal groove 13. The depth of the shoulder longitudinal groove 14 is constant over the entire length thereof.

Each shoulder longitudinal groove 14 includes a third longitudinal groove 31 that is connected to one inclined groove 12 of the inclined grooves 12 adjacent to each other in the tire circumferential direction, a fourth longitudinal groove 32 that is disposed at each position different from the position of the third longitudinal groove 31 in the tire width direction and the tire circumferential direction and is connected to the other inclined groove 12 of the inclined grooves 12 adjacent to each other in the tire circumferential direction, and a second step groove 33 that connects the third longitudinal groove 31 to the fourth longitudinal groove 32.

The respective lengths of the third longitudinal groove 31 and the fourth longitudinal groove 32 are equal to each other and are longer than the length of the second step groove 33. For example, the length of each of the third longitudinal groove 31 and the fourth longitudinal groove 32 is two or more times the length of the second step groove 33. The size of the second step groove 33 in the tire circumferential direction may be 0.03 or more times and 0.3 or less times the size of the shoulder longitudinal groove 14 in the tire circumferential direction and may be 0.05 or more times and 0.2 or less times the size thereof. A shift distance in the tire width direction between the third longitudinal groove 31 and the fourth longitudinal groove 32 is equal to or longer than the width of the shoulder longitudinal groove 14. A shift distance in the tire width direction between the third longitudinal groove 31 and the fourth longitudinal groove 32 may be 0.2 or more times and 0.8 or less times the width of the shoulder longitudinal groove 14 and may be 0.3 or more times and 0.7 or less times the width thereof. The inclination angle of the second step groove 33 with respect to the tire width direction may be 25° or more and 65° or less and may be 30° or more and 60° or less.

The third longitudinal groove 31 is positioned on the front side of the fourth longitudinal groove 32 in the rotation direction R and on the inside thereof in the tire width direction.

An outer shoulder longitudinal groove 35, which is positioned on the outside in the tire width direction, of each of the plurality of shoulder longitudinal grooves 14 arranged in the tire circumferential direction in a staggered manner has a width and a depth smaller than the width and depth of an inner shoulder longitudinal groove 36 positioned on the inside in the tire width direction. The inner shoulder longitudinal groove 36 has a width smaller than the width of the 2ND longitudinal groove 13 and has a depth equal to the depth thereof. An outer edge, which is positioned on the outside in the tire width direction, of the fourth longitudinal groove 32 of the inner shoulder longitudinal groove 36 is positioned closer to the inside in the tire width direction than an inner edge, which is positioned on the inside in the tire width direction, of the third longitudinal groove 31 of the outer shoulder longitudinal groove 35.

The width of the outer shoulder longitudinal groove 35 may be 0.1 or more times and 0.6 or less times the width of the 2ND longitudinal grooves 13 and may be 0.2 or more times and 0.5 or less times the width thereof. The outer shoulder longitudinal groove 35 has a width and a depth smaller than the width and depth of each of the inner portions 21d and 22d of the first inclined groove 21 and the second inclined groove 22. The width of the outer shoulder longitudinal groove 35 may be 0.1 or more times and 0.8 or less times the width of each of the inner portions 21d and 22d and may be 0.3 or more times and 0.6 or less times the width thereof. The outer shoulder longitudinal groove 35 is positioned closer to the outside in the tire width direction than a position that is spaced from the tire equator CL by about ¼ of the tread width W in the tire width direction.

The outer shoulder longitudinal groove 35 is adjacent to the 2ND longitudinal groove 13, which is positioned on the outside in the tire width direction, in the tire width direction among the plurality of 2ND longitudinal grooves 13 arranged in the tire circumferential direction in a staggered manner; and the inner shoulder longitudinal groove 36 is adjacent to the 2ND longitudinal groove 13, which is positioned on the inside in the tire width direction, in the tire width direction among the plurality of 2ND longitudinal grooves 13 arranged in the tire circumferential direction in a staggered manner.

Here, a front surface positioned on the front side in the rotation direction R among the inner surfaces defining the inclined groove 12 includes a first side surface 51 that includes an inner end portion in the tire width direction to which the 2ND longitudinal groove 13 is open, a second side surface 52 which is positioned closer to the inside in the tire width direction than the first side surface 51 and of which an outer end portion in the tire width direction is positioned closer to the rear side in the rotation direction R than the inner end portion of the first side surface 51 in the tire width direction, and a stepped surface 53 that connects an inner edge of the first side surface 51 in the tire width direction to an outer edge of the second side surface 52 in the tire width direction and faces the outside in the tire width direction.

The inclination angle of the first side surface 51 with respect to the tire width direction is smaller than the inclination angle of the second side surface 52 with respect to the tire width direction. A connection portion 55, which is connected to the first side surface 51, of a third side surface 54 positioned on the outside in the tire width direction among the inner surfaces defining the 2ND longitudinal groove 13 is formed in the shape of a curved surface protruding inward in the tire width direction. The radius of curvature of the connection portion 55 in a plan view seen from the outside in the tire radial direction may be 2 mm or more and 20 mm or less and may be 3 mm or more and 10 mm or less.

In the plan view, the second side surface 52 and the stepped surface 53 are connected to each other at an acute angle. In the plan view, an angle between the second side surface 52 and the stepped surface 53 may be 25° or more and 80° or less and may be 35° or more and 60° or less. The second side surface 52 and the stepped surface 53 may be connected to each other through a protruding curved surface portion. The size of the stepped surface 53 in the tire circumferential direction may be 1.0 mm or more and 6.0 mm or less and may be 1.5 mm or more and 4.0 mm or less. The size of the stepped surface 53 in the tire circumferential direction may be 0.5 or more times and 1.5 or less times the width of the connection portion 12a of the inclined groove 12 and may be 0.8 or more times and 1.3 or less times the width thereof. The stepped surface 53 may be positioned so as to be spaced from the tire equator CL in the tire width direction by 0.05 or more times and 0.35 or less times the tread width W or by 0.1 or more times and 0.3 or less times the tread width W. The stepped surface 53 is connected to the rear end portion of a fourth side surface 56, which is positioned on the inside in the tire width direction, in the rotation direction R without a step in the tire circumferential direction among the inner surfaces defining the 2ND longitudinal groove 13.

Here, a plurality of land portions 41 to 48 are divided on the tread surface portion 11 by the inclined grooves 12, the 2ND longitudinal grooves 13, and the shoulder longitudinal grooves 14, and a plurality of sipes 38a to 38h are formed on the land portions 41 to 48, respectively.

The details thereof will be described below.

A plurality of first sipes 38a extending in a direction substantially orthogonal to the first inclined groove 21 in the plan view are formed on a first center land portion 41 that is positioned between the first inclined grooves 21 adjacent to each other in the tire circumferential direction and is divided by the 2ND longitudinal groove 13 and the inner portion 22d of the second inclined groove 22.

A plurality of second sipes 38b extending in a direction substantially orthogonal to the second inclined groove 22 in the plan view are formed on a second center land portion 42 that is positioned between the second inclined grooves 22 adjacent to each other in the tire circumferential direction and is divided by the 2ND longitudinal groove 13 and the inner portion 21d of the first inclined groove 21.

A corner formed by the second side surface 52 and the stepped surface 53 is positioned at each of the portions of the first center land portion 41 and the second center land portion 42 that correspond to both the outer end portions in the tire width direction and the rear end portion in the rotation direction R.

A plurality of third sipes 38c, which gradually extend forward in the rotation direction R toward the outside from the inside in the tire width direction and of which the inclination angle with respect to the tire width direction is smaller than that of the first sipe 38a in the plan view, are formed on a first intermediate land portion 43 that is positioned between the first inclined grooves 21 adjacent to each other in the tire circumferential direction and is divided by the 2ND longitudinal groove 13 and the outer shoulder longitudinal groove 35.

A plurality of fourth sipes 38d extending substantially in parallel to the first sipes 38a in the plan view are formed on a second intermediate land portion 44 that is positioned between the first inclined grooves 21 adjacent to each other in the tire circumferential direction and is divided by the 2ND longitudinal groove 13 and the inner shoulder longitudinal groove 36.

A plurality of fifth sipes 38e, which gradually extend forward in the rotation direction R toward the outside from the inside in the tire width direction and of which the inclination angle with respect to the tire width direction is smaller than that of the second sipe 38b in the plan view, are formed on a third intermediate land portion 45 that is positioned between the second inclined grooves 22 adjacent to each other in the tire circumferential direction and is divided by the 2ND longitudinal groove 13 and the outer shoulder longitudinal groove 35.

A plurality of sixth sipes 38f extending substantially in parallel to the second sipe 38b in the plan view are formed on a fourth intermediate land portion 46 that is positioned between the second inclined grooves 22 adjacent to each other in the tire circumferential direction and is divided by the 2ND longitudinal groove 13 and the inner shoulder longitudinal groove 36.

A plurality of seventh sipes 38g and first narrow grooves 47a extending along the first inclined groove 21 are formed on first shoulder land portions 47 that are positioned between the first inclined grooves 21 adjacent to each other in the tire circumferential direction on the outer end portion of the tread surface portion 11 in the tire radial direction and are divided by the shoulder longitudinal grooves 14. Among the plurality of first shoulder land portions 47, the first narrow groove 47a is connected to the fourth longitudinal groove 32 on the land portion divided by the outer shoulder longitudinal groove 35 and is connected to the second step groove 33 on the land portion divided by the inner shoulder longitudinal groove 36. A bottom-raised portion 47b is formed on the inner end portion of each first narrow groove 47a in the tire width direction.

A plurality of eighth sipes 38h and second narrow grooves 48a extending along the second inclined groove 22 are formed on second shoulder land portions 48 that are positioned between the second inclined grooves 22 adjacent to each other in the tire circumferential direction on the outer end portion of the tread surface portion 11 in the tire radial direction and are divided by the shoulder longitudinal grooves 14. Among the plurality of second shoulder land portions 48, the second narrow groove 48a is connected to the fourth longitudinal groove 32 on the land portion divided by the outer shoulder longitudinal groove 35 and is connected to the second step groove 33 on the land portion divided by the inner shoulder longitudinal groove 36. A bottom-raised portion 48b is formed on the inner end portion of each second narrow groove 48a in the tire width direction.

According to the tire 1 of the present embodiment, the inclined grooves 12 gradually extend forward in the rotation direction R toward the tire equator CL from the outside in the tire width direction as described above. Accordingly, in a case where a vehicle travels on a wet road surface, water positioned in a portion of the inclined groove 12 connected to the 2ND longitudinal groove 13 from the outside in the tire width direction flows toward the tire equator CL and reaches the opening portion of the 2ND longitudinal groove 13. In this case, since the front surface of the inclined groove 12 includes the stepped surface 53 that connects the inner edge of the first side surface 51 in the tire width direction to the outer edge of the second side surface 52, which is positioned on the rear side of this inner edge in the rotation direction R, in the tire width direction and faces the outside in the tire width direction, water reaching the opening portion of the 2ND longitudinal groove 13 from the outside in the tire width direction collides with the stepped surface 53. Accordingly, the water is smoothly introduced into the 2ND longitudinal groove 13, so that drainage performance can be improved.

Further, since the inclined grooves 12 having a V shape to cross each other or to be close to each other near the tire equator CL in a plan view seen from the outside in the tire radial direction are formed on the tread surface portion 11, both drainage performance and steering stability during traveling on the snow can be achieved.

Furthermore, since the second side surface 52 and the stepped surface 53 are connected to each other at an acute angle in the plan view, water reaching the opening portion of the 2ND longitudinal groove 13 from the outside in the tire width direction in the inclined groove 12 can be reliably introduced into the 2ND longitudinal groove 13.

Moreover, since the connection portion 55, which is connected to the first side surface 51, of the third side surface 54 positioned on the outside in the tire width direction among the inner surfaces defining the 2ND longitudinal groove 13 is formed in the shape of a curved surface protruding inward in the tire width direction, water reaching the opening portion of the 2ND longitudinal groove 13 from the outside in the tire width direction in the inclined groove 12 can be more reliably introduced into the 2ND longitudinal groove 13.

Further, since the width of the 2ND longitudinal groove 13 is larger than the width of the shoulder longitudinal groove 14, water reaching the opening portion of the 2ND longitudinal groove 13 from the outside in the tire width direction in the inclined groove 12 can be more reliably introduced into the 2ND longitudinal groove 13.

Furthermore, since the width of the shoulder longitudinal groove 14 is smaller than the width of the 2ND longitudinal groove 13, side surfaces, which face each other in the tire width direction, among the inner surfaces defining the shoulder longitudinal groove 14 are caused to be in contact with each other or to be close to each other during turning. For this reason, the stiffness of the land portions can be increased, so that turning performance can be improved.

Moreover, since the width of the 2ND longitudinal groove 13 is larger than the width of the shoulder longitudinal groove 14, a lot of snow can enter the 2ND longitudinal groove 13, which is positioned on the inside in the tire width direction and in which a hard snow column is likely to be formed as compared to the shoulder longitudinal groove 14, while traveling on the snow. Accordingly, a large snow column-shear force is generated, so that on-snow grip performance can be improved.

Further, since the 2ND longitudinal groove 13 includes the first step groove 27 connecting the first longitudinal groove 25 and the second longitudinal groove 26 of which the positions in the tire width direction are different from each other, snow entering the 2ND longitudinal groove 13 is locked to the first step groove 27 during traveling on the snow. Accordingly, since the snow can be kept in the 2ND longitudinal groove 13 without coining out in the tire circumferential direction, a snow column-shear force is generated, so that on-snow grip performance can be reliably improved.

Furthermore, since the 2ND longitudinal groove 13, which is positioned on the inside in the tire width direction and in which a hard snow column is likely to be formed as compared to the shoulder longitudinal groove 14, includes the first step groove 27, on-snow grip performance can be effectively improved.

Moreover, since the first longitudinal groove 25 is positioned on the front side of the second longitudinal groove 26 in the rotation direction R and on the inside thereof in the tire width direction, water entering the 2ND longitudinal groove 13 from the inclined groove 12 through the second longitudinal groove 26 passes through the first step groove 27 and the first longitudinal groove 25 in this order without the generation of a reverse flow directed to the outside in the tire width direction. Accordingly, the 2ND longitudinal groove 13 includes the first longitudinal groove 25, the second longitudinal groove 26, and the first step groove 27, so that on-snow grip performance is improved but a reduction in drainage performance can be suppressed.

Further, since the first longitudinal groove 25 positioned on the front side of the second longitudinal groove 26 in the rotation direction R is positioned on the inside of the second longitudinal groove 26 in the tire width direction and is not positioned on the outside thereof in the tire width direction, it is possible to inhibit the first center land portion 41, the second center land portion 42, the first intermediate land portion 43, the second intermediate land portion 44, the third intermediate land portion 45, and the fourth intermediate land portion 46, which are defined by the 2ND longitudinal grooves 13, from being easily worn.

Furthermore, the shoulder longitudinal groove 14 includes the second step groove 33 connecting the third longitudinal groove 31 and the fourth longitudinal groove 32 of which the positions in the tire width direction are different from each other. Accordingly, edge portions, which are pointed in the tire width direction, are formed on the first intermediate land portion 43, the second intermediate land portion 44, the third intermediate land portion 45, the fourth intermediate land portion 46, the first shoulder land portion 47, and the second shoulder land portion 48 that are defined by the shoulder longitudinal grooves 14 and are positioned on the outside of the 2ND longitudinal grooves 13 in the tire width direction. As a result, turning performance on the snow can be improved.

Moreover, since the shoulder longitudinal groove 14 includes the second step groove 33, snow entering the shoulder longitudinal groove 14 is locked to the second step groove 33 during traveling on the snow. Accordingly, since the snow can be kept in the shoulder longitudinal groove 14 without coming out in the tire circumferential direction, on-snow grip performance can be reliably improved.

Further, since the 2ND longitudinal grooves 13 adjacent to each other in the tire circumferential direction are arranged so as to have positions different from each other in the tire width direction, snow, which enters the connection portion 12a of the inclined groove 12 connected to the 2ND longitudinal groove 13 and the 2ND longitudinal groove 13, bumps into a portion, which faces the opening portion of the 2ND longitudinal groove 13 in the tire circumferential direction, among the inner surfaces defining the inclined groove 12 during traveling on the snow. Accordingly, since the snow can be kept without being moved in the tire circumferential direction, on-snow grip performance can be reliably improved.

Furthermore, since the width of at least the connection portion 12a of the inclined groove 12 connected to the 2ND longitudinal groove 13 is equal to or larger than the width of the 2ND longitudinal groove 13, a lot of snow can be caused to enter the connection portion 12a of the inclined groove 12 during traveling on the snow. As a result, on-snow grip performance can be reliably improved.

The technical scope of the present invention is not limited to the above-mentioned embodiment and can be variously modified without departing from the scope of the present invention.

Configuration where the 2ND longitudinal grooves 13 adjacent to each other in the tire circumferential direction are arranged so as to have positions different from each other in the tire width direction is shown in the embodiment, but the 2ND longitudinal grooves 13 adjacent to each other in the tire circumferential direction may be arranged so as to have the same positions in the tire width direction.

Further, the 2ND longitudinal grooves 13 and the shoulder longitudinal grooves 14 may extend straight in the tire circumferential direction.

Furthermore, the connection portion 55 of the third side surface 54 of the 2ND longitudinal groove 13 connected to the first side surface 51 may extend straight in the tire circumferential direction.

Moreover, the inclined grooves 12 may be spaced from the tire equator CL without crossing the tire equator CL, and the first inclined groove 21 and the second inclined groove 22 may not cross each other.

Since the inclined grooves gradually extend forward in the rotation direction toward the tire equator from the outside in the tire width direction in the present invention, water positioned in a portion of the inclined groove connected to the 2ND longitudinal groove from the outside in the tire width direction flows toward the tire equator and reaches the opening portion of the 2ND longitudinal groove in a case where a vehicle travels on a wet road surface. In this case, since the front surface of the inclined groove includes the stepped surface that connects the inner edge of the first side surface in the tire width direction to the outer edge of the second side surface, which is positioned on the rear side of this inner edge in the rotation direction, in the tire width direction and faces the outside in the tire width direction, water reaching the opening portion of the 2ND longitudinal groove from the outside in the tire width direction collides with the stepped surface. Accordingly, the water is smoothly introduced into the 2ND longitudinal groove, so that drainage performance can be improved.

Further, since the inclined grooves having a V shape to cross each other or to be close to each other near the tire equator in a plan view seen from the outside in the tire radial direction are formed on the tread surface portion, both drainage performance and steering stability during traveling on the snow can be achieved.

Here, the second side surface and the stepped surface may be connected to each other at an acute angle in a plan view seen from the outside in the tire radial direction.

In this case, since the second side surface and the stepped surface are connected to each other at an acute angle in the plan view, water reaching the opening portion of the 2ND longitudinal groove from the outside in the tire width direction in the inclined groove can be reliably introduced into the 2ND longitudinal groove.

Furthermore, the connection portion, which is connected to the first side surface, of the third side surface positioned on the outside in the tire width direction among the inner surfaces defining the 2ND longitudinal groove may be formed in the shape of a curved surface protruding inward in the tire width direction.

In this case, since the connection portion, which is connected to the first side surface, of the third side surface positioned on the outside in the tire width direction among the inner surfaces defining the 2ND longitudinal groove is formed in the shape of a curved surface protruding inward in the tire width direction, water reaching the opening portion of the 2ND longitudinal groove from the outside in the tire width direction in the inclined groove can be more reliably introduced into the 2ND longitudinal groove. Moreover, the width of the 2ND longitudinal groove may be larger than the width of the shoulder longitudinal groove.

In this case, since the width of the 2ND longitudinal groove is larger than the width of the shoulder longitudinal groove, water reaching the opening portion of the 2ND longitudinal groove from the outside in the tire width direction in the inclined groove can be more reliably introduced into the 2ND longitudinal groove.

Further, since the width of the shoulder longitudinal groove is smaller than the width of the 2ND longitudinal groove, side surfaces, which face each other in the tire width direction, among the inner surfaces defining the shoulder longitudinal groove are caused to be in contact with each other or to be close to each other during turning. For this reason, the stiffness of the land portions can be increased, so that turning performance can be improved.

Furthermore, since the width of the 2ND longitudinal groove is larger than the width of the shoulder longitudinal groove, a lot of snow can be caused to enter the 2ND longitudinal groove, which is positioned on the inside in the tire width direction and in which a hard snow column is likely to be formed as compared to the shoulder longitudinal groove, during traveling on the snow. Accordingly, a large snow column-shear force is generated, so that on-snow grip performance can be improved.

Moreover, each 2ND longitudinal groove may include a first longitudinal groove that is connected to one inclined groove of the inclined grooves adjacent to each other in the tire circumferential direction, a second longitudinal groove that is disposed at each position different from the position of the first longitudinal groove in the tire width direction and the tire circumferential direction and is connected to the other inclined groove of the inclined grooves adjacent to each other in the tire circumferential direction, and a first step groove that connects the first longitudinal groove to the second longitudinal groove.

In this case, since the 2ND longitudinal groove includes the first step groove connecting the first and second longitudinal grooves of which the positions in the tire width direction are different from each other, snow entering the 2ND longitudinal groove is locked to the first step groove during traveling on the snow. Accordingly, since the snow can be kept in the 2ND longitudinal groove without coming out in the tire circumferential direction, a snow column-shear force is generated, so that on-snow grip performance can be reliably improved.

Further, since the 2ND longitudinal groove, which is positioned on the inside in the tire width direction and in which a hard snow column is likely to be formed as compared to the shoulder longitudinal groove, includes the first step groove, on-snow grip performance can be effectively improved.

Furthermore, the first longitudinal groove may be positioned on the front side of the second longitudinal groove in the rotation direction and on the inside thereof in the tire width direction.

In this case, since the first longitudinal groove is positioned on the front side of the second longitudinal groove in the rotation direction and on the inside thereof in the tire width direction, water entering the 2ND longitudinal groove from the inclined groove through the second longitudinal groove passes through the first step groove and the first longitudinal groove in this order without the generation of a reverse flow directed to the outside in the tire width direction. Accordingly, the 2ND longitudinal groove includes the first longitudinal groove, the second longitudinal groove, and the first step groove, so that on-snow grip performance is improved but a reduction in drainage performance can be suppressed.

Further, since the first longitudinal groove positioned on the front side of the second longitudinal groove in the rotation direction is positioned on the inside of the second longitudinal groove in the tire width direction and is not positioned on the outside thereof in the tire width direction, it is possible to inhibit the land portions, which are defined by the 2ND longitudinal grooves, from being easily worn.

Furthermore, each shoulder longitudinal groove may include a third longitudinal groove that is connected to one inclined groove of the inclined grooves adjacent to each other in the tire circumferential direction, a fourth longitudinal groove that is disposed at each position different from the position of the third longitudinal groove in the tire width direction and the tire circumferential direction and is connected to the other inclined groove of the inclined grooves adjacent to each other in the tire circumferential direction, and a second step groove that connects the third longitudinal groove to the fourth longitudinal groove.

In this case, the shoulder longitudinal groove includes the second step groove connecting the third and fourth longitudinal grooves of which the positions in the tire width direction are different from each other. Accordingly, edge portions, which are pointed in the tire width direction, are formed on the land portions that are defined by the shoulder longitudinal grooves and are positioned on the outside of the 2ND longitudinal grooves in the tire width direction. As a result, turning performance on the snow can be improved.

Further, since the shoulder longitudinal groove includes the second step groove, snow entering the shoulder longitudinal groove is locked to the second step groove during traveling on the snow. Accordingly, since the snow can be kept in the shoulder longitudinal groove without coming out in the tire circumferential direction, on-snow grip performance can be reliably improved.

Moreover, the components of the above-mentioned embodiment can be appropriately substituted with well-known components without departing from the scope of the present invention, and the above-mentioned modification examples may be appropriately combined with each other.

INDUSTRIAL APPLICABILITY

In a case where the tire according to the embodiment of the present invention is applied to a relevant field, drainage performance can be improved.

REFERENCE SIGNS LIST

1 Tire
11 Tread surface portion
12 Inclined groove
13 2ND longitudinal groove
14 Shoulder longitudinal groove
25 First longitudinal groove
26 Second longitudinal groove
27 First step groove
31 Third longitudinal groove
32 Fourth longitudinal groove
33 Second step groove
51 First side surface
52 Second side surface
53 Stepped surface
54 Third side surface
55 Connection portion CL Tire equator
R Rotation direction

The invention claimed is:
1. A tire comprising:
a tread surface portion,
wherein the tread surface portion is provided with a plurality of inclined grooves that have a V shape to cross each other or to be close to each other near a tire equator in a plan view seen from an outside in a tire radial direction and are arranged in a tire circumferential direction, a plurality of second longitudinal grooves that connect the inclined grooves adjacent to each other in the tire circumferential direction, and a plurality of shoulder longitudinal grooves that are positioned closer to an outside in a tire width direction than the second longitudinal grooves and connect the inclined grooves adjacent to each other in the tire circumferential direction,
the tire includes an indicator portion that indicates a rotation direction of the tire in which a vehicle travels forward,
each of the plurality of inclined grooves gradually extends forward in the rotation direction toward the tire equator from the outside in the tire width direction, and
a front surface positioned on a front side in the rotation direction among inner surfaces defining each of the plurality of inclined grooves includes a first side surface that includes an inner end portion in the tire width direction to which each of the plurality of second longitudinal grooves is open, a second side surface which is positioned closer to an inside in the tire width direction than the first side surface and of which an outer end portion in the tire width direction is positioned closer to a rear side in the rotation direction than the inner end portion of the first side surface in the tire width direction, and a stepped surface that connects an inner edge of the first side surface in the tire width direction to an outer edge of the second side surface in the tire width direction and faces the outside in the tire width direction,
wherein each of the plurality of the second longitudinal grooves includes:
a first part longitudinal groove that is connected to a first one of the inclined grooves adjacent to each other in the tire circumferential direction and that extends in parallel with the tire equator;
a second part longitudinal groove that is disposed at each position different from a position of the first part longitudinal groove in the tire width direction and the tire circumferential direction and is connected to a second one of the inclined grooves adjacent to each other in the tire circumferential direction and that extends in parallel with the tire equator, and
a first step groove that connects the first part longitudinal groove to the second part longitudinal groove.
2. The tire according to claim 1,
wherein the second side surface and the stepped surface are connected to each other at an acute angle in the plan view seen from the outside in the tire radial direction.
3. The tire according to claim 1,
wherein a connection portion, which is connected to the first side surface, of a third side surface positioned on the outside in the tire width direction among inner surfaces defining each of the plurality of second longitudinal grooves is formed in a shape of a curved surface protruding inward in the tire width direction.

4. The tire according to claim 1,
wherein a width of each of the plurality of second longitudinal grooves is larger than a width of each of the plurality of shoulder longitudinal grooves.
5. The tire according to claim 1,
wherein the first part longitudinal groove is positioned on a front side of the second part longitudinal groove in the rotation direction and on an inside thereof in the tire width direction.
6. The tire according to claim 1,
wherein each of the plurality of shoulder longitudinal grooves includes a third longitudinal groove that is connected to a first one of the inclined grooves adjacent to each other in the tire circumferential direction, a fourth longitudinal groove that is disposed at each position different from a position of the third longitudinal groove in the tire width direction and the tire circumferential direction and is connected to a second one of the inclined grooves adjacent to each other in the tire circumferential direction, and a second step groove that connects the third longitudinal groove to the fourth longitudinal groove.
7. The tire according to claim 2,
wherein a connection portion, which is connected to the first side surface, of a third side surface positioned on the outside in the tire width direction among inner surfaces defining each of the plurality of second longitudinal grooves is formed in a shape of a curved surface protruding inward in the tire width direction.
8. The tire according to claim 2,
wherein a width of each of the plurality of second longitudinal grooves is larger than a width of the shoulder longitudinal groove.
9. The tire according to claim 3,
wherein a width of each of the plurality of second longitudinal grooves is larger than a width of the shoulder longitudinal groove.
10. The tire according to claim 7,
wherein a width of each of the plurality of second longitudinal grooves is larger than a width of the shoulder longitudinal groove.
11. The tire according to claim 2,
wherein each of the plurality of second longitudinal grooves includes the first part longitudinal groove that is connected to a first one of the inclined grooves adjacent to each other in the tire circumferential direction, the second part longitudinal groove that is disposed at each position different from a position of the first part longitudinal groove in the tire width direction and the tire circumferential direction and is connected to a second one of the inclined grooves adjacent to each other in the tire circumferential direction, and the first step groove that connects the first longitudinal groove to the second longitudinal groove.
12. The tire according to claim 3,
wherein each of the plurality of second longitudinal grooves includes the first part longitudinal groove that is connected to a first one of the inclined grooves adjacent to each other in the tire circumferential direction, the second part longitudinal groove that is disposed at each position different from a position of the first part longitudinal groove in the tire width direction and the tire circumferential direction and is connected to a second one of the inclined grooves adjacent to each other in the tire circumferential direction, and the first step groove that connects the first longitudinal groove to the second longitudinal groove.

13. The tire according to claim 4,
wherein each of the plurality of second longitudinal grooves includes the first part longitudinal groove that is connected to a first one of the inclined grooves adjacent to each other in the tire circumferential direction, the second part longitudinal groove that is disposed at each position different from a position of the first part longitudinal groove in the tire width direction and the tire circumferential direction and is connected to a second one of the inclined grooves adjacent to each other in the tire circumferential direction, and the first step groove that connects the first longitudinal groove to the second longitudinal groove.

14. The tire according to claim 8,
wherein each of the plurality of second longitudinal grooves includes the first part longitudinal groove that is connected to a first one of the inclined grooves adjacent to each other in the tire circumferential direction, the second part longitudinal groove that is disposed at each position different from a position of the first part longitudinal groove in the tire width direction and the tire circumferential direction and is connected to a second one of the inclined grooves adjacent to each other in the tire circumferential direction, and the first step groove that connects the first longitudinal groove to the second longitudinal groove.

15. The tire according to claim 9,
wherein each of the plurality of second longitudinal grooves includes the first part longitudinal groove that is connected to a first one of the inclined grooves adjacent to each other in the tire circumferential direction, the second part longitudinal groove that is disposed at each position different from a position of the first part longitudinal groove in the tire width direction and the tire circumferential direction and is connected to a second one of the inclined grooves adjacent to each other in the tire circumferential direction, and the first step groove that connects the first longitudinal groove to the second longitudinal groove.

16. The tire according to claim 10,
wherein each of the plurality of second longitudinal grooves includes the first part longitudinal groove that is connected to a first one of the inclined grooves adjacent to each other in the tire circumferential direction, the second part longitudinal groove that is disposed at each position different from a position of the first part longitudinal groove in the tire width direction and the tire circumferential direction and is connected to a second one of the inclined grooves adjacent to each other in the tire circumferential direction, and the first step groove that connects the first longitudinal groove to the second longitudinal groove.

17. The tire according to claim 11,
wherein the first longitudinal groove is positioned on a front side of the second longitudinal groove in the rotation direction and on an inside thereof in the tire width direction.

18. The tire according to claim 12,
wherein the first longitudinal groove is positioned on a front side of the second longitudinal groove in the rotation direction and on an inside thereof in the tire width direction.

19. The tire according to claim 13,
wherein the first longitudinal groove is positioned on a front side of the second longitudinal groove in the rotation direction and on an inside thereof in the tire width direction.

\* \* \* \* \*